INVENTOR.
MARION M. CUNNINGHAM
BY *J. P. Keiper*
ATTORNEY.

March 23, 1937.  M. M. CUNNINGHAM  2,074,372
TESTING APPARATUS
Filed July 9, 1934  4 Sheets-Sheet 3
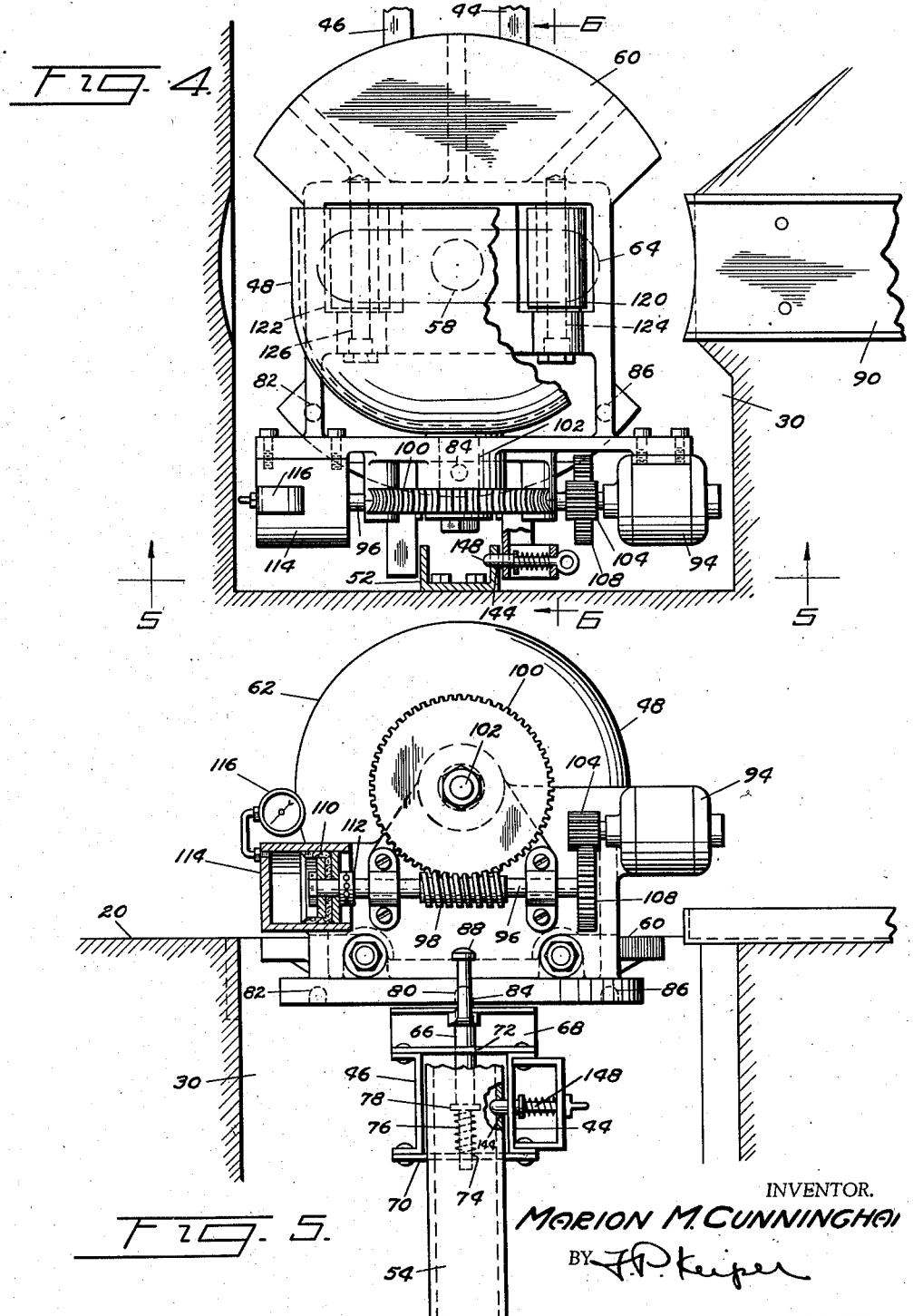

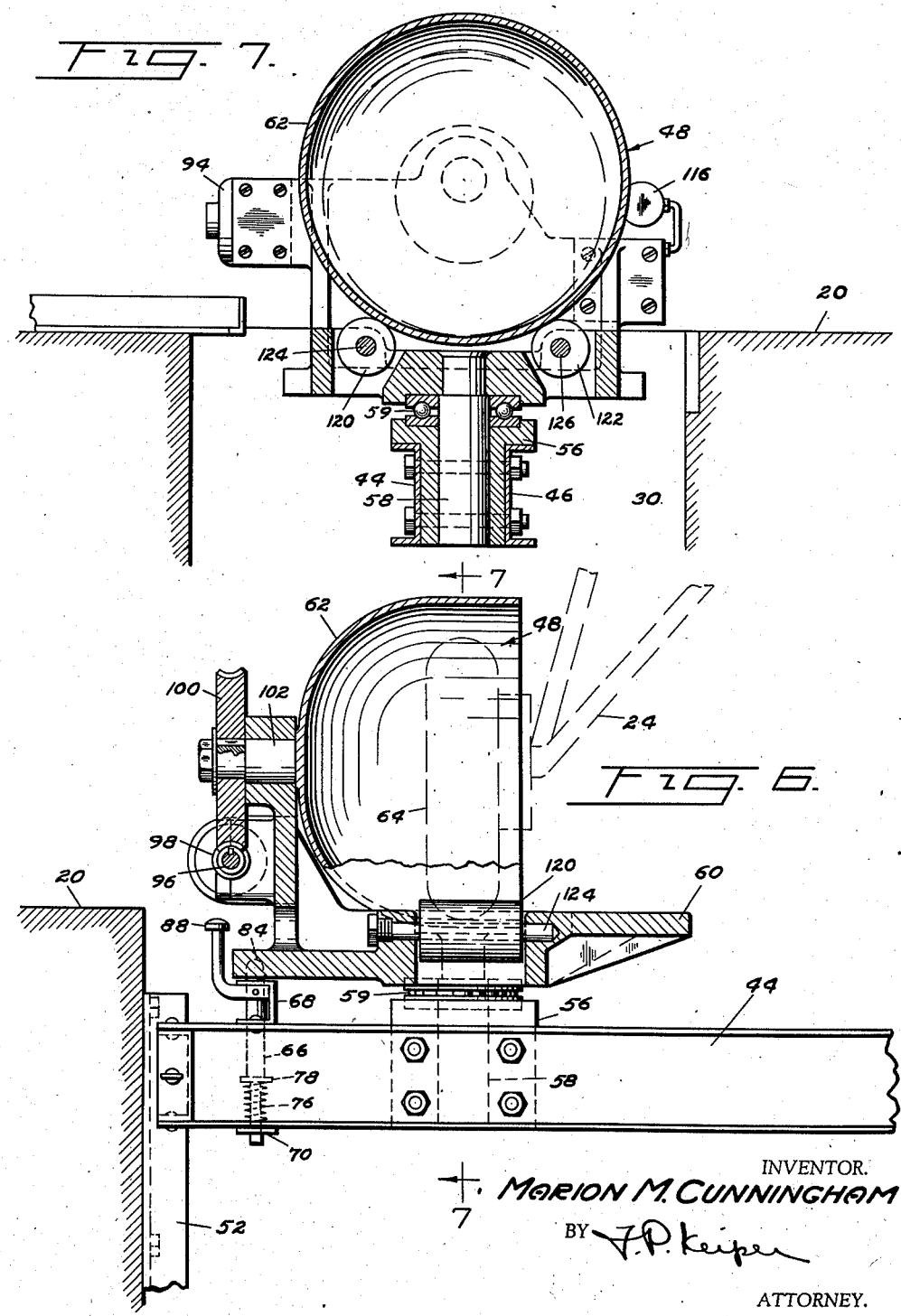

Patented Mar. 23, 1937

2,074,372

UNITED STATES PATENT OFFICE 2,074,372

TESTING APPARATUS

Marion M. Cunningham, South Bend, Ind., assignor to Bendix Aviation Corporation, South Bend, Ind., a corporation of Delaware Application July 9, 1934, Serial No. 734,396

9 Claims. (Cl. 265—25)

This invention relates to testing apparatus adapted to be employed at aviation fields, primarily for the testing of the brakes of airplanes and also for holding the plane while testing the motors, and for weighing the same as well as lowering the fuselage to convenient loading height.

More particularly the invention has to do with a novel form of brake testing device supported upon a hydraulic lift, which brake testing device may also be employed as an anchor against movement of the plane during motor testing and which hydraulic lift may be used to weigh the plane and lower the same so that the fuselage will be at a convenient loading height and horizontal.

An object of the invention is to provide a novel brake testing unit employing a shell having an internal annular continuous track adapted to receive a vehicle wheel, together with mechanism for conveniently permitting a vehicle wheel to be placed therewithin for the purpose of being tested while within the shell, the rotation of the shell imparting rotation to the wheel.

Another object of the invention is to provide in combination with a substantially cylindrical internal track, means for driving the track against the resistance of a wheel brake.

A further object of the invention is to provide means for readily permitting the placing of the wheels of a vehicle within the internal drum track.

The above and other novel features of the invention will appear more fully hereinafter from the following detailed description when taken in conjunction with the accompanying drawings. It is expressly understood, however, that the drawings are for purposes of illustration only and are not designed as a definition of the invention, reference being had for this purpose to the appended claims.

In the drawings wherein like reference characters indicate like parts:

Fig. 4 is a top plan view illustrating in detail the brake testing unit and its driving mechanism;

Fig. 5 is a side elevation of Fig. 4 generally taken on the line 5—5 of Fig. 4, certain parts thereof being shown in section;

Fig. 6 is a section of Fig. 4 taken on the line 6—6;

Fig. 7 is a section of Fig. 6 taken on the line 7—7, and

Fig. 8 is a section of a modified form of testing unit employing an internal conical tread.

Figure 1:
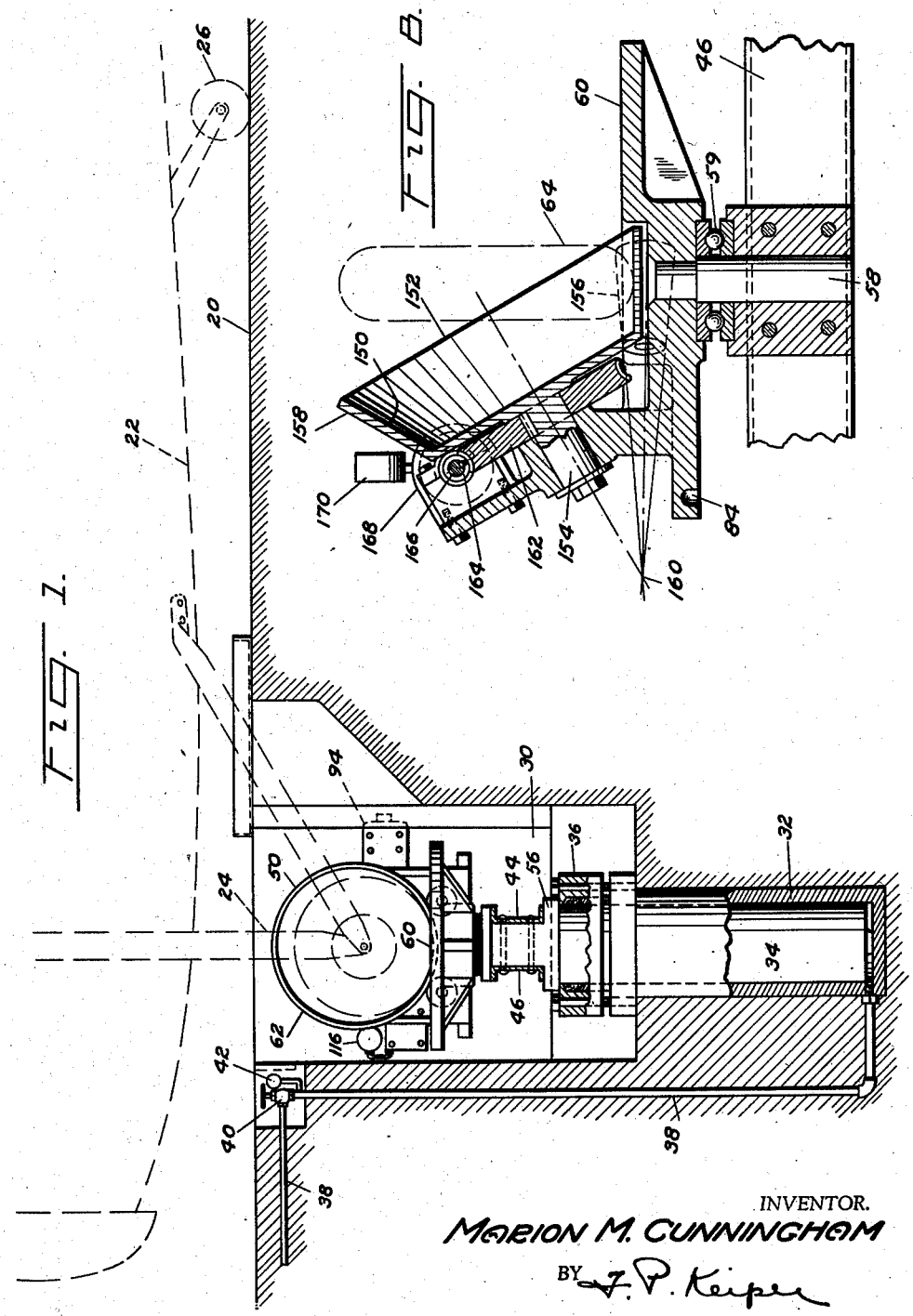
Fig. 1 is a side elevation partly in section showing the hydraulic lift and brake testing units and an airplane supported thereby.

Referring more particularly to Fig. 1 there is shown therein the level surface 20 of, for example, an aviation landing field, an airplane body 10 22, a landing gear 24 and tail wheel 26. In an excavation generally indicated by 30 there is inserted a hydraulic lift having a cylinder 32 and piston 34 with usual stuffing glands 36 to prevent leakage of the fluid employed in operating the 15 lift. A supply pipe line 38 having a valvular control 40 and a pressure indicating gauge 42 is connected to the cylinder and through which pipe line fluid is forced into the cylinder or ejected therefrom. Secured on the top of the piston 34 20 for movement therewith are a pair of horizontal transverse channel members 44 and 46 which are adapted to support adjacent their ends a pair of wheel supports generally indicated as 48 and 50. The end of the channel members 44 and 46 are 25 adapted to engage the vertical tracks 52 and 54 set in the side of the excavated cavity 30 and which tracks are adapted to steady the lift in its upward and downward movement and also to resist any tendency of the lift to turn as a result 30 of unequalized brakes as will appear hereinafter.

As illustrated in Figs. 2 to 7, the wheel supporting means 48 and 50 each comprise a support block or base 56 rigidly secured to the channel members 44 and 46 and which blocks are adapted through 35 trunnions 58 to swively support a wheel tread 60 and revoluble internal drum or shell 62, and anti-friction bearings 59 are preferably employed to support the load and ease the turning of the wheel support 50. 40

Figure 2:
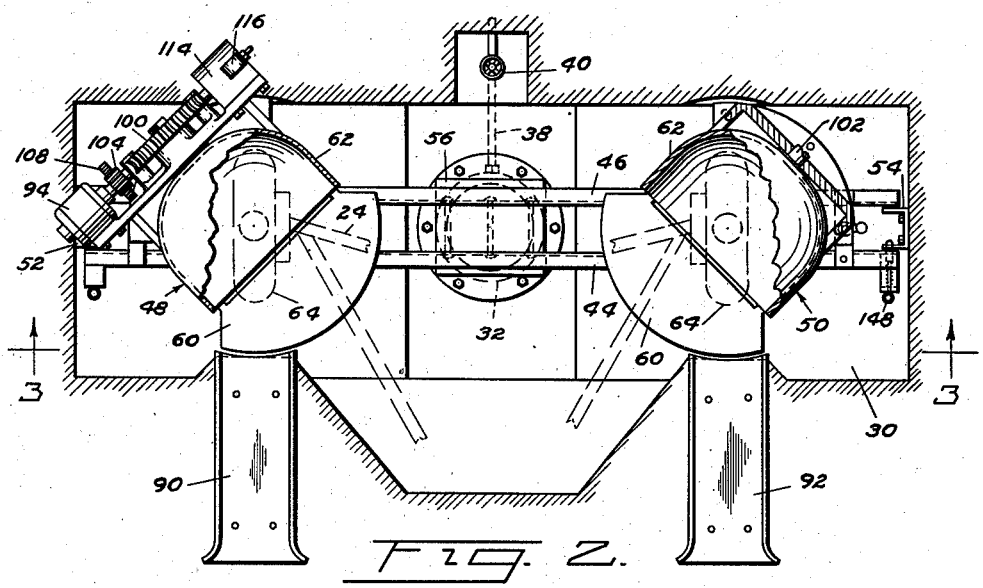
Fig. 2 is a top plan view of the lift illustrating the brake testing drums set at an angle for access thereinto and shown partly in section.
Figure 3:
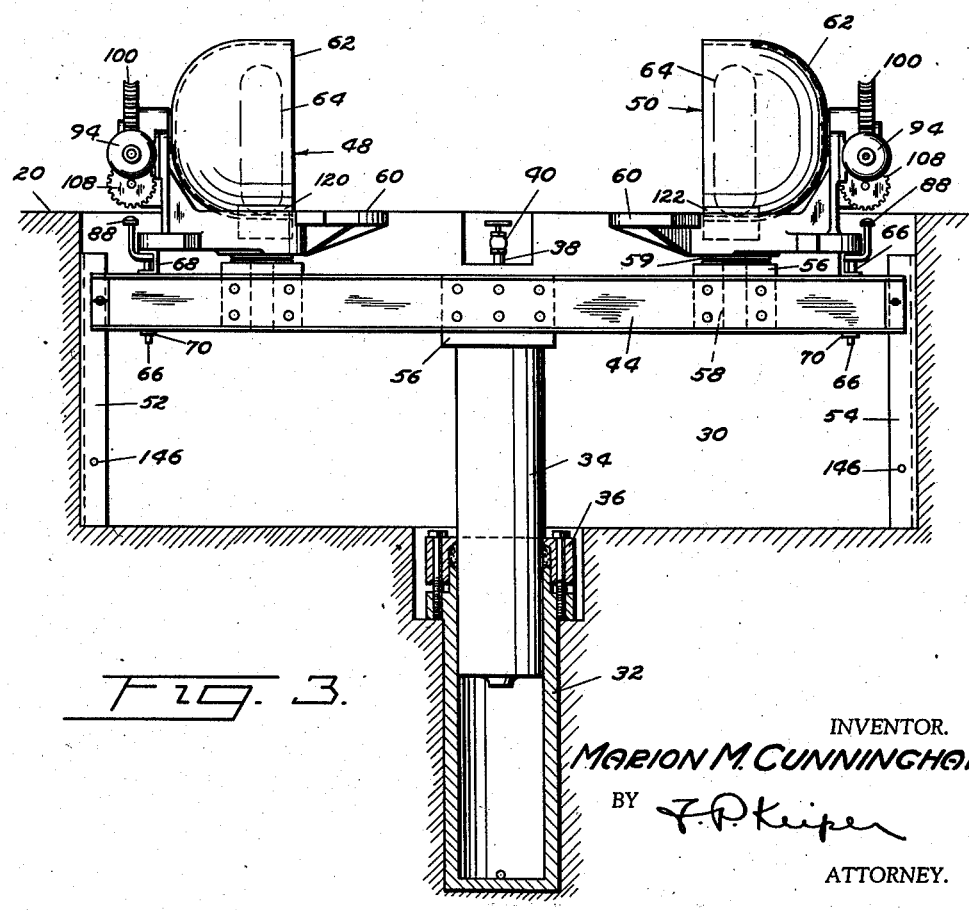
Fig. 3 is a rear elevation of the lift and brake testing units, the hydraulic cylinder being shown in section and is taken generally on the line 3—3 of Fig. 2.

As illustrated in Fig. 2, the wheel treads and revoluble drums are swively arranged for the purpose of permitting the wheels 64 of an airplane to enter and to be enclosed therein. For the purpose of locking the wheel supports in the 45 position shown in Fig. 2 or in the position shown in Fig. 4 or Fig. 3 or Fig. 1, a manually operable lock is provided which is constituted by a pin 66 slidable vertically in apertures 72 and 74 formed in transverse members 68 and 70 secured across 50 and between the channel members 44 and 46. A spring 76 acting against a shoulder 78 on the pin 66 is adapted to urge the same upward and the head 80 of the pin is adapted to be received in 55 any one of the three pockets 82, 94 and 86 provided in the underside of the tread plate 60. To release the pin to permit swivelling of the revoluble drum and wheel tread to various positions illustrated, a knob 88 conveniently arranged to be operated by the foot is secured to the rod on pin 66 so that the same may be pushed downward and withdrawn from the pockets 82, 84, and 86 provided in the underside of the plate 60. Suitable runways 90 and 92 are provided so that the vehicle may be rolled onto the support drum plates and into the units.

To test the brakes, means are provided for rotating each of the drums individually and for this purpose there is shown an electric motor 94 geared to a shaft 96 which carries the worm 98, which, in turn, is adapted to drive a worm wheel 100 secured to the shaft 102 which carries the driving torque to the rotatable drum shell 62.

In order to test the efficiency of the brakes, torque measuring means are provided which measures the thrust imposed upon the worm 68 while transmitting its force to the worm wheel 100. For this purpose the shaft 96 is permitted to move a certain amount longitudinally upon its axis and for this purpose the pinion 104 is provided with considerable length so that its meshing gear 108 may move longitudinally through without becoming disengaged.

The thrust of the shaft 96 is resisted by a cylinder 114 and piston 110 which are connected to a gauge 116 which is adapted to indicate the pressure therein and in order to transmit the thrust to the piston 110 free of the turning movement of the shaft 96, a thrust bearing 112 is provided at the end of the shaft 96, the thrust bearing being adapted to transmit thrust only to the piston 110 and compress or place the fluid within the cylinder 114 under compression.

The revoluble drum 62, which may have its inner surface knurled to prevent slippage to promote traction between the vehicle wheel and the inner surface, is preferably supported upon a pair of rollers 120 and 122 mounted on short shafts 124 and 126 carried in the tread plate 60 as best illustrated in Fig. 6. The use of the support rollers in this manner relieves the shaft 102 from the weight of the vehicle and generally aids in providing an adequate efficient structure for the purpose desired.

Referring to the modification of Fig. 8 it will appear that there is therein shown an internal tread 150 having a generally conical surface. The shell 152 on which this tread is situated is carried upon a short shaft 154 and tapered roller 156 which engages the outer surface 158 of the shell 152. The roller 156 will, of course, be best provided with a taper such as will reduce friction and which tapers will concur in a common apex or point 160 also common to the taper of the shell surface 158. Similar to the first modification, the shell may be driven by a worm wheel 162 and worm 164 and a shaft 166 which may be driven by a motor in a similar fashion to Fig. 5 and the thrust of the shaft 166 may be absorbed and measured by a cylinder and piston 168 connected to a gauge 170.

The use of the device will be clearly apparent from the foregoing description. For example, the front wheels of the carriage of a plane may be driven into the shells 62 while the same are set at an angle as illustrated in Fig. 2. Thereafter, the shells are turned parallel so that the axis corresponds substantially to the wheel axis or at least lie in substantially the same vertical plane, and thereafter the brakes of the airplane may be tested by rotating the shells against the resistance of the wheel brakes and measuring the thrust pressures on each of the gauges 160. After a test of the brakes, the motors of the plane may be tested, it being unnecessary for this test to anchor the plane since the wheels are retained within the shell 62 and are prevented from moving as a result of the thrust imposed upon the plane by the propeller during the testing operation.

In order to safeguard against lowering of the lift during test due to leakage or loss of the pressure in the hydraulic lift cylinder 34, it has been found desirable to supply the channel member 46 with a set of spring pressed manually releasable pins 148 which are adapted to engage apertures 144 in the guide members 52 and 54 which apertures may be placed at a plurality of convenient or suitable points in the guide members.

While the plane is supported upon the lift, the same may be weighed by releasing the pins 148 thus indicating on the gauge 42 the hydraulic pressure within the cylinder 32 necessary to lift or sustain the forward end of the plane, and the weight of the plane may be measured both with the plane lifted to a three pointed landing position or with the plane in the position as shown in Fig. 1, its normal flying aspect, or any desired intermediate position. It will be apparent, of course, that the weight upon the tail wheel 26 is generally light and is often negligible in considering the load weight of a plane but the weight resting upon the tail wheel may be measured by any suitable means if so desired, to obtain the overall weight.

It will thus appear that there is provided a novel mechanism for use on landing fields in conjunction with airplanes and that the use thereof enables the testing of the plane and its equipment, the weighing of the plane and also facilitates loading of the plane since the same may be loaded in a position in which the fuselage is adjacent to and horizontal with the ground surface. It will, of course, be appreciated that loading of a plane is facilitated when the same is in the position shown in Fig. 1 or its normal flying aspect.

Only two embodiments of the invention have been illustrated and described in the combination, and it is to be understood that the invention is not limited thereto but may be embodied in various other mechanical arrangements. Various changes may be made in the construction and arrangement of parts without departing from the spirit of the invention as will be apparent to those skilled in the art and reference therefore should be had to the appended claims for a limit of the definition of the invention.

What is claimed is:

1. A brake testing device comprising a drum adapted to receive therein a vehicle wheel, said drum being of a diameter only slightly in excess of the wheel diameter, roller supporting means for said drum contacting the outer surface thereof, means independent of the vehicle wheel and the supporting means to rotate the drum against the resistance of a brake applied to said vehicle wheel, and means for measuring the turning torque.

2. A brake testing device comprising a drum adapted to receive therein a vehicle wheel, means for rotatably supporting the drum, and means for swivelly carrying said supporting means whereby the drum may be swivelled about a vertical axis.

3. In a brake testing device, a hollow drum having a wheel tread therein, means for rotating said drum about a horizontal axis, and means swivelly mounting said drum to swing about a vertical axis.

4. A brake testing device comprising a revoluble hollow drum having a wheel tread therein and an open end, a base for said drum, rollers on the base and engaging the drum, and a support for said base and drum, said base and drum being swivelly mounted on said support for rotation about a vertical axis.

5. A testing device comprising a centrally supported transverse support, a base plate swivelly mounted on each end of the support, a revoluble member having an internal wheel track mounted on each plate, drive means including torque measuring means for rotating said revoluble members and means for latching said plates in any one of a number of swivel positions, one of said positions being with the axes of the revoluble members in a common vertical plane.

6. A testing device comprising a centrally supported transverse support, a base plate swivelly mounted on each end of the support, means for latching said plates in any one of a number of swivelled positions, a revoluble member having an internal wheel track mounted on each plate, drive means including torque measuring means for rotating said revoluble members, and means for holding said transverse support against turning movement about its central support.

7. In a brake testing device, a hollow shell having a tread therein, means for rotating said shell about a horizontal axis and means swivelly mounting said shell to swing about a vertical axis.

8. In a brake testing device, a hollow cone having a tread therein for receiving a vehicle wheel.

9. A brake testing device comprising a cone having an internal tread adapted to receive a vehicle wheel therein, means independent of the vehicle wheel to rotate the cone against the resistance of a brake applied to said vehicle wheel, and means for measuring the turning torque.

MARION M. CUNNINGHAM.